(12) United States Patent
Yoo et al.

(10) Patent No.: US 12,530,874 B2
(45) Date of Patent: Jan. 20, 2026

(54) METHOD AND DEVICE FOR ANALYZING PATHOLOGICAL SLIDE IMAGE

(71) Applicant: Lunit Inc., Seoul (KR)

(72) Inventors: Dong Geun Yoo, Seoul (KR); Sang Hoon Song, Anseong-si (KR); Chan Young Ock, Seoul (KR); Won Kyung Jung, Seoul (KR); Soo Ick Cho, Seoul (KR); Kyung Hyun Paeng, Seoul (KR)

(73) Assignee: Lunit Inc., Seoul (KR)

( * ) Notice: Subject to any disclaimer, the term of this patent is extended or adjusted under 35 U.S.C. 154(b) by 390 days.

(21) Appl. No.: 18/178,233

(22) Filed: Mar. 3, 2023

(65) Prior Publication Data
US 2023/0281971 A1  Sep. 7, 2023

(30) Foreign Application Priority Data

Mar. 3, 2022 (KR) .................. 10-2022-0027211
Feb. 9, 2023 (KR) .................. 10-2023-0017338

(51) Int. Cl.
*G06V 10/774* (2022.01)
*G06T 7/00* (2017.01)
*G06V 20/69* (2022.01)

(52) U.S. Cl.
CPC .......... *G06V 10/774* (2022.01); *G06T 7/0012* (2013.01); *G06V 20/698* (2022.01);
(Continued)

(58) Field of Classification Search
CPC ............ G06T 10/774; G06T 7/0012; G06T 2207/20081; G06T 2207/30024; G06T 2207/10056; G06T 2207/20084; G06T 2207/10024; G06T 2207/30096; G06T 2207/20076; G06T 11/01; G06T 2207/10064; G06T 2207/30132; G06T 3/40; G06T 7/0014; G06T 7/10;
(Continued)

(56) References Cited

U.S. PATENT DOCUMENTS 9,818,190 B2  11/2017 Chukka et al.
10,713,794 B1 * 7/2020 He .................. G06N 3/084
(Continued)

FOREIGN PATENT DOCUMENTS

KR   10-2155381 B1   9/2020
KR   10-2170297 B1   10/2020
(Continued)

OTHER PUBLICATIONS

U.S. Appl. No. 62/787,047, filed Dec. 31, 2018, Yip et al.
(Continued)

*Primary Examiner* — Tsung Yin Tsai
(74) *Attorney, Agent, or Firm* — Sughrue Mion, PLLC

(57) ABSTRACT

Provided is a computing device including at least one memory, and at least one processor configured to obtain a first pathological slide image one of a first object and biological information of the first object, generate training data by using at least one first patch included in the first pathological slide image, and the biological information, train a first machine learning model based on the training data, and analyze a second pathological slide image of a second object by using the trained first machine learning model.

16 Claims, 15 Drawing Sheets

(52) U.S. Cl.
CPC .............. *G06T 2207/20081* (2013.01); *G06T 2207/30024* (2013.01); *G06V 2201/03* (2022.01)

(58) Field of Classification Search
CPC .. G06T 7/11; G06T 7/344; G06T 7/30; G06V 20/698; G06V 2201/03; G06V 10/08; G06V 10/82; G06V 10/774; G06V 20/69; G06V 10/761; G06V 10/7715; G06V 10/46; G06V 20/695; G16H 30/40; G16H 50/20; G16H 50/70; G16H 30/20; G16H 70/60; G16H 10/40; G16H 15/00; G16H 50/50; G16H 50/30; G16H 20/10; G16H 40/67; G06N 3/08; G06N 3/0464; G06N 3/09; G06N 20/00; G06N 3/045; G06N 3/0455; G06N 3/084; G06N 3/04; G06N 3/0475; G06N 3/094; G06N 5/046; G06N 3/004; G06N 3/088; G16B 40/20; G16B 45/00; G16B 20/00; G16B 25/10; G16B 50/10; G16B 20/20; G16B 5/00; G16B 50/00; G06F 3/14; G01N 1/30; A61B 5/0033; A61B 5/7275; C12Q 1/6883; C12Q 2600/158; Y10S 128/924
See application file for complete search history.

(56) References Cited

U.S. PATENT DOCUMENTS

| | | | | |
|---|---|---|---|---|
| 10,957,041 | B2* | 3/2021 | Yip | G06N 3/084 |
| 2018/0144209 | A1* | 5/2018 | Kim | G06N 3/04 |
| 2019/0287645 | A1* | 9/2019 | Abdueva | G16B 30/10 |
| 2020/0152289 | A1* | 5/2020 | Cleary | C12Q 1/6841 |
| 2020/0394825 | A1 | 12/2020 | Stumpe et al. | |
| 2021/0103757 | A1* | 4/2021 | Jang | G06V 10/80 |
| 2021/0103797 | A1* | 4/2021 | Jang | G06V 30/19173 |
| 2021/0125074 | A1* | 4/2021 | Lee | G06V 20/647 |
| 2021/0230684 | A1* | 7/2021 | Ariazi | C12Q 1/6827 |
| 2021/0233659 | A1* | 7/2021 | Chennubhotla | G06F 18/211 |
| 2021/0357694 | A1* | 11/2021 | Lee | G16H 30/40 |
| 2021/0358571 | A1* | 11/2021 | Islam | G16H 50/20 |
| 2021/0366577 | A1* | 11/2021 | Koller | G06N 3/045 |
| 2022/0180975 | A1* | 6/2022 | Regev | G16B 40/20 |
| 2022/0261988 | A1* | 8/2022 | Yoo | G16H 50/20 |
| 2022/0262513 | A1* | 8/2022 | Yoo | G16H 50/20 |
| 2022/0292670 | A1* | 9/2022 | Raciti | G16H 30/20 |
| 2023/0281971 | A1* | 9/2023 | Yoo | G06T 7/0012 |
| | | | | 382/133 |
| 2024/0257910 | A1* | 8/2024 | Chung | G16B 40/10 |

FOREIGN PATENT DOCUMENTS

| | | | | |
|---|---|---|---|---|
| KR | 10-2246319 | B1 | 5/2021 | |
| KR | 10-2021-0139195 | A | 11/2021 | |
| WO | 2021/133847 | A1 | 7/2021 | |
| WO | 2021/236544 | A1 | 11/2021 | |
| WO | WO-2022191943 | A1 * | 9/2022 | ............. G06N 3/045 |

OTHER PUBLICATIONS

Yair Rivenson et al., "Virtual histological staining of unlabelled tissue-autofluorescence images via deep learning", Nature Biomedical Engineering, 2019, vol. 3, pp. 466-477 (15 pages total).
Extended European Search Report dated Jul. 7, 2025 from the European Patent Office in Application No. 23763647.7.

* cited by examiner

METHOD AND DEVICE FOR ANALYZING PATHOLOGICAL SLIDE IMAGE

CROSS-REFERENCE TO RELATED APPLICATION

This application is based on and claims priority under 35 U.S.C. § 119 to Korean Patent Applications No. 10-2022-0027211, filed on Mar. 3, 2022, and No. 10-2023-0017338, filed on Feb. 9, 2023, in the Korean Intellectual Property Office, the disclosure of which is incorporated by reference herein in its entirety.

BACKGROUND

1. Field

The present disclosure relates to a method and device for analyzing a pathological slide image.

2. Description of the Related Art

The field of digital pathology refers to a field of obtaining histological information or predicting a prognosis of a subject by using a whole slide image generated by scanning a pathological slide image.

The pathological slide image may be obtained from a stained tissue sample of an object. For example, a tissue sample may be stained by various staining methods, such as hematoxylin and eosin, trichrome, periodic acid-Schiff, autoradiography, enzyme histochemistry, immunofluorescence, and immunohistochemistry. The stained tissue sample may be used for histology and biopsy evaluations, and thus may operate as a basis for determining whether to move on to molecular profile analysis to understand a disease state.

Recognizing and detecting biological elements from a pathological slide image have important effects on histological diagnosis or prognosis of a particular disease and determination of a therapeutic direction. However, poor performance of a machine learning model for detecting or segmenting biological elements from a pathological slide image may be an obstacle to establishing an accurate treatment plan for a subject. Meanwhile, in order to improve the performance of a machine learning model, it is necessary to prepare a large amount of annotated data, but such a preparation process requires a lot of cost.

SUMMARY

Provided are a method and device for analyzing a pathological slide image. Provided is a computer-readable recording medium having recorded thereon a program for executing the method on a computer. The objects to be achieved are not limited to the objects as described above, and other objects may be obtained.

Additional aspects will be set forth in part in the description which follows and, in part, will be apparent from the description, or may be learned by practice of the presented embodiments of the disclosure.

According to an aspect of an embodiment, a computing device includes at least one memory, and at least one processor configured to obtain a first pathological slide image one of a first object, and biological information of the first object, generate training data by using at least one first patch included in the first pathological slide image, and the biological information, train a first machine learning model based on the training data, and analyze a second pathological slide image of a second object by using the trained first machine learning model.

According to an aspect of another embodiment, a method of analyzing a pathological slide image includes obtaining a first pathological slide image of first object, and biological information of the at least one first object, generating training data by using at least one first patch included in the first pathological slide image, and the biological information, training a first machine learning model based on the training data, and analyzing a second pathological slide image of a second object by using the trained first machine learning model.

According to an aspect of another embodiment, a computer-readable recording medium includes a recording medium recording thereon a program for causing a computer to execute the above-described method.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
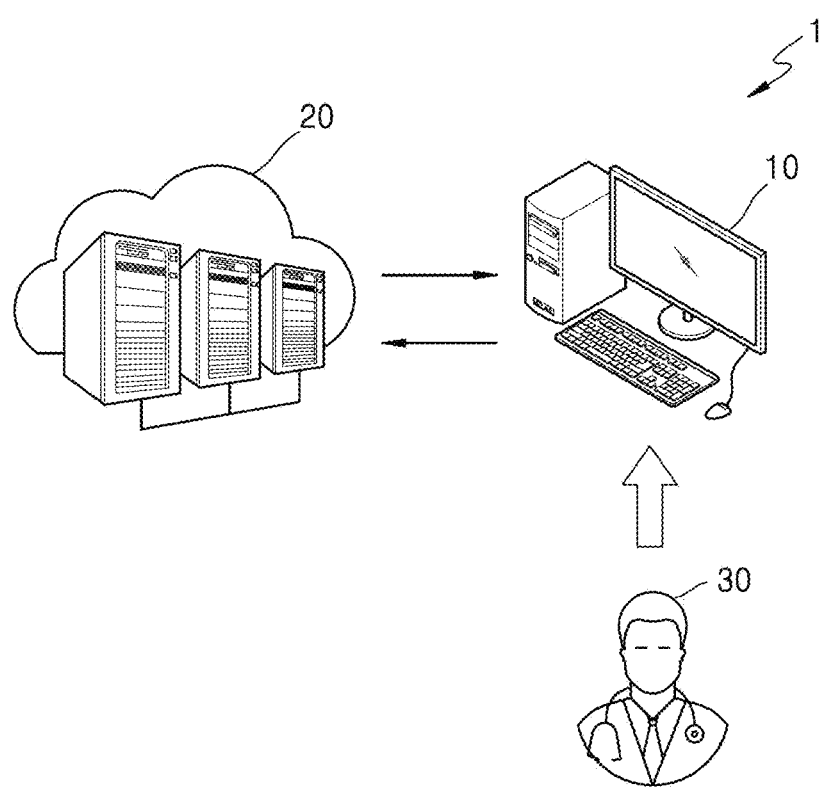
FIG. 1 is a diagram for describing an example of a system for analyzing a pathological slide image according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used in embodiments are selected as currently widely used general terms as possible, which may vary depending on intentions or precedents of one of ordinary skill in the art, emergence of new technologies, and the like. In addition, in certain cases, there are also terms arbitrarily selected by the applicant, and in this case, the meaning thereof will be defined in detail in the description. Therefore, the terms used herein should be defined based on the meanings of the terms and the details throughout the present description, rather than the simple names of the terms.

Throughout the present specification, when a part "includes" a component, it means that the part may additionally include other components rather than excluding other components as long as there is no particular opposing recitation. In addition, the term, such as " . . . unit" or " . . . module" described herein, refers to a unit that processes at least one function or operation, which may be implemented as hardware or software, or a combination of hardware and software.

In addition, although the terms such as "first" or "second" may be used herein to describe various elements, these elements should not be limited by these terms. These terms may be only used to distinguish one element from another.

According to an embodiment, a "pathological slide image" may refer to an image obtained by photographing a pathological slide that is fixed and stained via a series of chemical treatment processes for tissue or the like removed from a human body. In addition, the pathological slide image may refer to a whole slide image (WSI) including a high-resolution image of a whole slide, and may also refer to a portion of the whole slide image, for example, one or more patches. For example, the pathological slide image may refer to a digital image captured or scanned via a scanning apparatus (e.g., a digital scanner or the like), and may include information about a particular protein, cell, tissue, and/or structure within a human body. In addition, the pathological slide image may include one or more patches, and histological information may be applied (e.g., tagged) to the one or more patches via an annotation operation.

According to an embodiment, "medical information" may refer to any medically meaningful information that may be extracted from a medical image, and may include, for example, the region, position, and size of a particular tissue (e.g., a cancer tissue or a cancer stroma tissue) and/or a particular cell (e.g., a tumor cell, a lymphocyte, a macrophage, an endothelial cell, or a fibroblast) in a medical image, diagnostic information regarding cancer, information associated with a subject's possibility of developing cancer, and/or a medical conclusion associated with cancer treatment, but is not limited thereto. In addition, the medical information may include not only a quantified numerical value that may be obtained from a medical image, but also information obtained by visualizing the numerical value, predictive information according to the numerical value, image information, statistical information, and the like. The medical information generated as described above may be provided to a user terminal or output or transmitted to a display device to be displayed.

Hereinafter, embodiments will be described in detail with reference to the accompanying drawings. The embodiments may, however, be embodied in many different forms and should not be construed as being limited to the embodiments set forth herein.

FIG. 1 is a diagram for describing an example of a system for analyzing a pathological slide image according to an embodiment.

Referring to FIG. 1, a system 1 includes a user terminal 10 and a server 20. For example, the user terminal 10 and the server 20 may be connected to each other by a wired or wireless communication method to transmit and/or receive data (e.g., image data or the like) to and/or from each other.

For convenience of description, FIG. 1 illustrates that the system 1 includes the user terminal 10 and the server 20, but the present disclosure is not limited thereto. For example, other external devices (not shown) may be included in the system 1, and operations of the user terminal 10 and the server 20 to be described below may be implemented by a single device (e.g., the user terminal 10 or the server 20) or more devices.

The user terminal 10 may be a computing device that is provided with a display device and a device (e.g., a keyboard, a mouse, or the like) for receiving a user input, and includes a memory and a processor. For example, the user terminal 10 may correspond to a notebook personal computer (PC), a desktop PC, a laptop, a tablet computer, a smart phone, or the like, but is not limited thereto.

The server 20 may be a device that communicates with an external device (not shown) including the user terminal 10. For example, the server 20 may be a device that stores various types of data including a pathological slide image, a bitmap image corresponding to the pathological slide image, information generated by analyzing the pathological slide image (e.g., information about at least one tissue and cell expressed in the pathological slide image, biomarker expression information, or the like), and information about a machine learning model used for analyzing the pathological slide image. Alternatively, the server 20 may be a computing device including a memory and a processor, and having an operation capability. In a case in which the server 20 is a computing device, the server 20 may perform at least some of operations of the user terminal 10 to be described below with reference to FIGS. 1 to 13B. For example, the server 20 may also be a cloud server, but is not limited thereto.

The user terminal 10 outputs an image representing information generated by analyzing a pathological slide image and/or a pathological slide. For example, various pieces of information about at least one tissue and cell expressed in the pathological slide image may be expressed in the image. In addition, biomarker expression information may be expressed in the image. In addition, the image may be a report including medical information about at least a partial region included in the pathological slide image.

The pathological slide image may refer to an image obtained by photographing a pathological slide that is fixed and stained through a series of chemical treatment processes in order to observe, with a microscope, a tissue or the like removed from a human body. For example, the pathological slide image may refer to a whole slide image including a high-resolution image of a whole slide. As another example, the pathological slide image may refer to a part of the high-resolution whole slide image.

In addition, the pathological slide image may refer to a patch region obtained by dividing the whole slide image into patch units. For example, the patch may have a size of a certain region. Alternatively, the patch may refer to a region including each of objects included in the whole slide.

In addition, the pathological slide image may refer to a digital image captured by using a microscope, and may include information about cells, tissues, and/or structures in the human body.

Biological elements (e.g., cancer cells, immune cells, cancer regions, etc.) expressed in the pathological slide image may be identified by analyzing the pathological slide image. These biological elements may be used for histological diagnosis of a disease, prognosis of a disease, determination of a therapeutic direction for a disease, and the like.

Meanwhile, a machine learning model may be used in analyzing the pathological slide image. In this case, it is necessary to train the machine learning model to recognize biological elements from the pathological slide image. Training data often depends on annotation tasks performed by an expert (e.g., a pathologist) on pathological slide images. Here, the annotation tasks include operations, performed by experts, of marking the positions and types of cells and/or tissues expressed in the pathological slide images one by one.

However, due to different standards of the respective experts, it is difficult for results of annotation to provide consistent information. In addition, because the performance improvement of the machine learning model is proportional to the amount of annotation tasks, a lot of cost needs to be allocated to the annotation tasks in order to generate a high-performance machine learning model.

The user terminal 10 according to an embodiment analyzes the pathological slide image by using the machine learning model. In this case, the user terminal 10 generates training data by using a pathological slide image in which an object is expressed, and biological information of the object, and trains the machine learning model by using the training data.

Thus, unlike conventional training of a machine learning model that depends on annotation tasks by experts, the user terminal 10 may improve the performance of the machine learning model even without performing annotation tasks (or even with a small amount of annotation results). Accordingly, the accuracy of a result of analyzing a pathological slide image by the machine learning model may be improved. In addition, the user terminal 10 may predict a therapeutic reaction of a subject by using a result of analyzing the pathological slide image, and thus, the accuracy of the result of predicting the therapeutic reaction may also be guaranteed.

For example, the user terminal 10 may generate training data by utilizing spatial transcriptomics information of the object. Thus, unlike conventional training data that depends on annotation tasks by experts, deterioration in the performance of the machine learning model due to different experts' standards may be solved. In addition, by utilizing the spatial transcriptomics information, spatial gene expression information may be obtained from the pathological slide image. In addition, a spatial transcriptomics process may be configured such that a single spot includes several cells. Thus, gene expression information obtained from a single spot may be more objective than the information determined by an expert's visual recognition ability.

As another example, the user terminal 10 may generate the training data by using pathological slide images in which the object is stained by different methods. Depending on the staining methods, biological elements expressed in particular colors (e.g., proteins located in cell membranes or cell nuclei) in the pathological slide images may differ from each other. Thus, different biological elements may be identified from the pathological slide images that are stained by the different methods. Accordingly, in a case in which pathological slide images stained by different methods are used as the training data, the performance of the machine learning model may be improved.

Hereinafter, an example in which the user terminal 10 trains a machine learning model, analyzes a pathological slide image by using the trained machine learning model, and predicts a therapeutic reaction of the subject by using an analysis result will be described with reference to FIGS. 2 to 13B.

In addition, although the present specification describes, for convenience of description, that the user terminal 10 trains the machine learning model, analyzes the pathological slide image by using the trained machine learning model, and predicts the therapeutic reaction of the subject by using the analysis result, the present disclosure is not limited thereto. For example, at least some of operations of the user terminal 10 described here may be performed by the server 20.

In other words, at least some of operations of the user terminal 10 described with reference to FIGS. 1 to 13B may be performed by the server 20. For example, the server 20 may generate the training data by using pathological slide images in which objects are expressed, and biological information of the objects. In addition, the server 20 may train the machine learning model based on the training data. In addition, the server 20 may analyze a pathological slide image by using the trained machine learning model, and transmit a result of the analysis to the user terminal 10. In addition, the server 20 may predict a therapeutic reaction of the subject by using the result of the analysis, and transmit a result of the prediction to the user terminal 10. However, the operation of the server 20 is not limited to the above.

Figure 2:
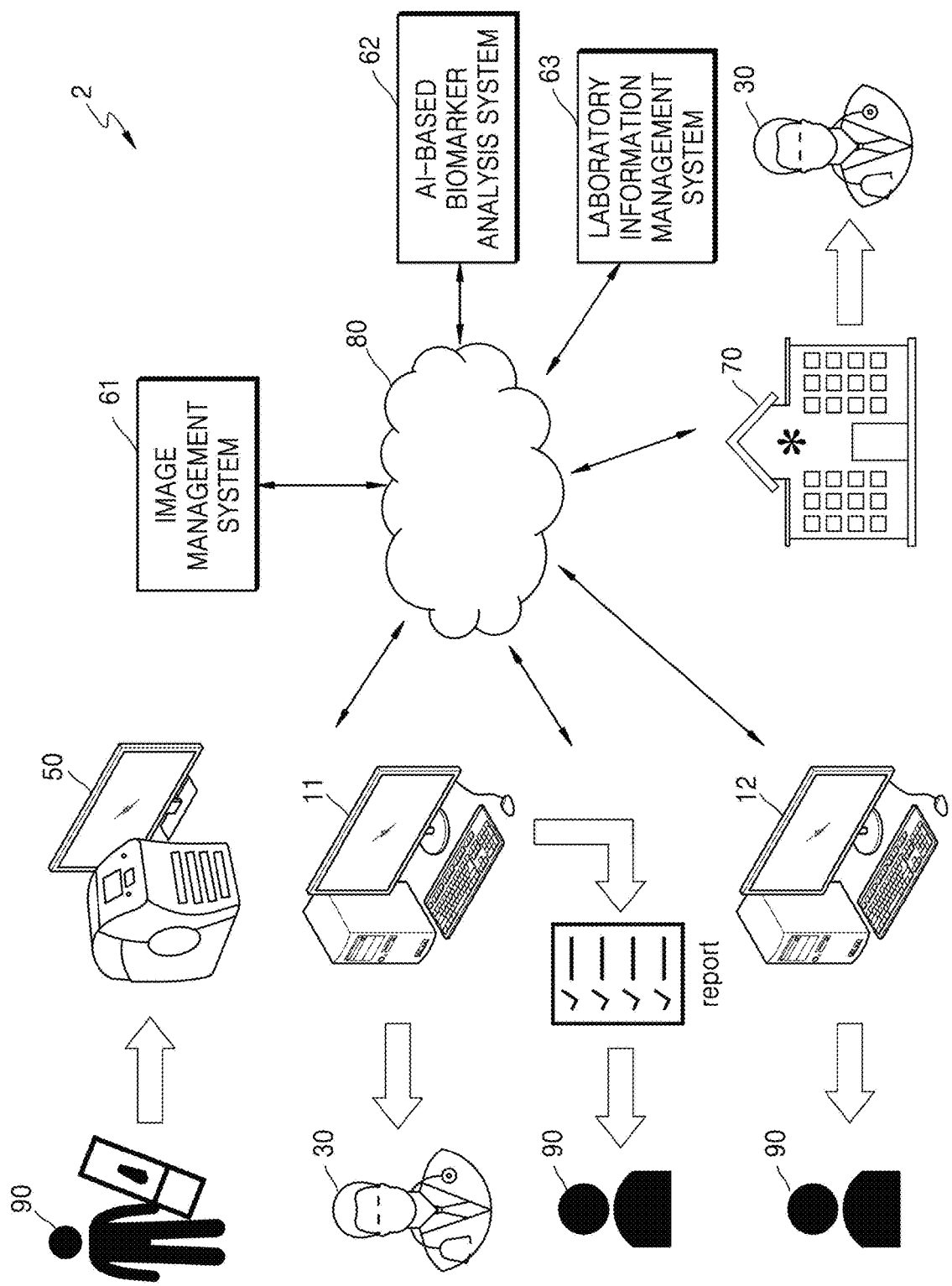
FIG. 2 is a block diagram of a system and a network for preparing, processing, and reviewing slide images of tissue specimens by using a machine learning model, according to an embodiment.

FIG. 2 is a block diagram of a system and a network for preparing, processing, and reviewing slide images of tissue specimens by using a machine learning model, according to an embodiment.

Referring to FIG. 2, a system 2 includes user terminals 11 and 12, a scanner 50, an image management system 61, an artificial intelligence (AI)-based biomarker analysis system 62, a laboratory information management system 63, and a server 70. In addition, the components (11, 12, 50, 61, 62, 63, and 70) included in the system 2 may be connected to each other through a network 80. For example, the network 80 may be a network through which the components (11, 12, 50, 61, 62, 63, and 70) may be connected to each other by a wired or wireless communication method. For example, the system 2 illustrated in FIG. 2 may include a network that may be connected to servers in hospitals, research facilities, laboratories, and the like, and/or user terminals of doctors or researchers.

According to various embodiments of the present disclosure, methods to be described below with reference to FIGS. 3A to 13B may be performed by the user terminals 11 and 12, the image management system 61, the AI-based biomarker analysis system 62, the laboratory information management system 63, and/or the hospital or laboratory server 70.

The scanner 50 may obtain a digitized image from a tissue sample slide of a subject 90. For example, the scanner 50, the user terminals 11 and 12, the image management system 61, the AI-based biomarker analysis system 62, the laboratory information management system 63, and/or the hospital or laboratory server 70 may be connected to the network 80, such as the Internet, through one or more computers, servers, and/or mobile devices, respectively, or may communicate with a user 30 and/or the subject 90 through one or more computers, and/or mobile devices.

The user terminals 11 and 12, the image management system 61, the AI-based biomarker analysis system 62, the laboratory information management system 63, and/or the hospital or laboratory server 70 may generate or otherwise obtain from another device, one or more tissue samples of the subject 90, a tissue sample slide, digitized images of the tissue sample slide, or any combination thereof. In addition, the user terminals 11 and 12, the image management system 61, the AI-based biomarker analysis system 62, and the laboratory information management system 63 may obtain any combination of pieces of subject-specific information, such as age, medical history, cancer treatment history, family history, and past biopsy records of the subject 90, or disease information of the subject 90.

The scanner 50, the user terminals 11 and 12, the image management system 61, the laboratory information management system 63, and/or the hospital or laboratory server 70 may transmit digitized slide images and/or subject-specific information to the AI-based biomarker analysis system 62 through the network 80.

The AI-based biomarker analysis system 62 may include one or more storage devices (not shown) for storing images and data received from at least one of the scanner 50, the user terminals 11 and 12, the image management system 61, the laboratory information management system 63, and/or the hospital or laboratory server 70. In addition, the AI-based biomarker analysis system 62 may include a machine learning model repository that stores a machine learning model trained to process the received images and data. For example, the AI-based biomarker analysis system 62 may include a machine learning model that is trained to predict, from a pathological slide image of the subject 90, at least one of information about at least one cell, information about at least one region, information related to a biomarker, medical diagnostic information, and/or medical treatment information.

The scanner 50, the user terminals 11 and 12, the AI-based biomarker analysis system 62, the laboratory information management system 63, and/or the hospital or laboratory server 70 may transmit, to the image management system 61 through the network 80, a digitized slide image, subject-specific information, and/or a result of analyzing the digitized slide image. The image management system 61 may include a repository for storing received images and a repository for storing analysis results.

In addition, according to various embodiments of the present disclosure, a machine learning model that is trained to predict, from a slide image of the subject 90, at least one of information about at least one cell, information about at least one region, information related to a biomarker, medical diagnostic information, and/or medical treatment information, may be stored in the user terminals 11 and 12 and/or the image management system 61 and operate.

According to various embodiments of the present disclosure, a method of analyzing a pathological slide image, a method of processing subject information, a method of selecting a subject group, a method of designing a clinical trial, a method of generating biomarker expression information, and/or a method of setting a reference value for a particular biomarker may be performed not only by the AI-based biomarker analysis system 62, but also by the user terminals 11 and 12, the image management system 61, the laboratory information management system 63, and/or the hospital or laboratory server 70.

Figure 3A:
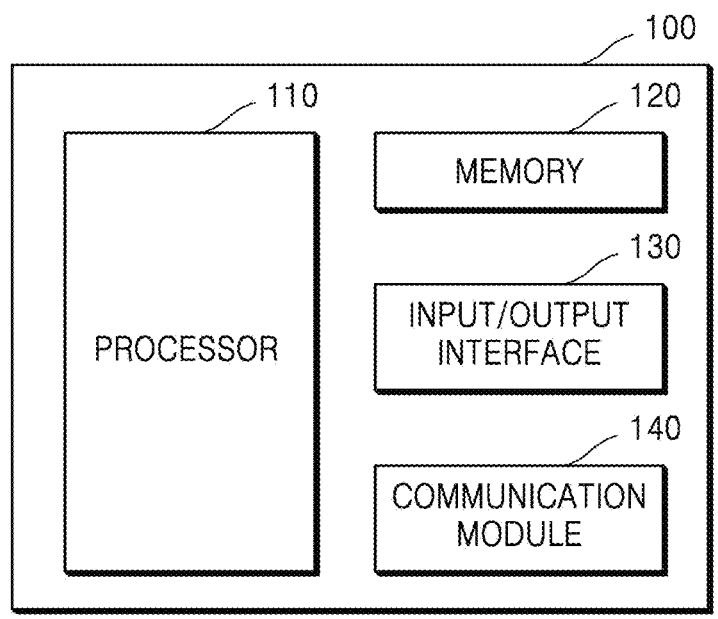
FIG. 3A is a block diagram illustrating an example of a user terminal according to an embodiment.

FIG. 3A is a block diagram illustrating an example of a user terminal according to an embodiment.

Referring to FIG. 3A, a user terminal 100 includes a processor 110, a memory 120, an input/output interface 130, and a communication module 140. For convenience of description, FIG. 3A illustrates only components related to the present disclosure. Accordingly, the user terminal 100 may further include other general-purpose components, in addition to the components illustrated in FIG. 3A. In addition, it is obvious to those of skill in the art related to the present disclosure that the processor 110, the memory 120, the input/output interface 130, and the communication module 140 illustrated in FIG. 3A may also be implemented as independent devices.

In addition, the operation of the user terminal 100 may be performed by the user terminals 11 and 12, the image management system 61, the AI-based biomarker analysis system 62, the laboratory information management system 63, and/or the hospital or laboratory server 70 of FIG. 2.

The processor 110 may process commands of a computer program by performing basic arithmetic, logic, and input/output operations. Here, the commands may be provided from the memory 120 or an external device (e.g., the server 20, etc.). In addition, the processor 110 may control the overall operation of other components included in the user terminal 100.

The processor 110 may obtain a first pathological slide image in which at least one first object is expressed, and biological information of the at least one first object. For example, the biological information may include at least one of information identified from a third pathological slide image and spatial transcriptomics information of the first object. Here, the third pathological slide image may include a pathological slide image in which the at least one first object is stained by a method that is different from that of the first pathological slide image.

In addition, the processor 110 may generate training data by using at least one first patch included in the first pathological slide image, and the biological information. For example, the training data may include at least one of gene expression information corresponding to the first patch, and the type of at least one cell expressed in the first patch.

In addition, the processor 110 may train a first machine learning model based on the training data, and analyze a second pathological slide image (i.e., a pathological slide image of a second object) by using the trained first machine learning model. For example, the processor 110 may train the first machine learning model by using the training data as ground-truth data. As another example, the processor 110 may train the first machine learning model by using, as ground-truth data, at least one annotation generated based on a user input. As yet another example, the processor 110 may train the first machine learning model by using the training data and at least one annotation as ground-truth data.

In addition, the processor 110 may generate a second machine learning model by adding at least one layer to the trained first machine learning model or removing at least one layer included in the trained first machine learning model. Here, the second machine learning model may be used to identify the type of at least one cell expressed in the second pathological slide image.

Also, the processor 110 may predict a therapeutic reaction of a subject corresponding to the second pathological slide image by using spatial transcriptomics information of the second object expressed in the second pathological slide image. Here, the spatial transcriptomics information of the second object may include at least one of spatial transcriptomics information obtained by the trained first machine learning model and separately obtained spatial transcriptomics information.

For example, prediction of a therapeutic reaction may be performed by a third machine learning model. For example, the third machine learning model may be trained by using a feature vector extracted from at least one layer included in the first machine learning model. As another example, the third machine learning model may be trained by using gene expression information included in spatial transcriptomics information, and position information corresponding to the gene expression information.

In addition, the processor 110 may use the first patch included in the first pathological slide image and a second patch included in the third pathological slide image, as the training data for training the first machine learning model. Alternatively, the processor 110 may use the first patch and a third patch that is obtained by image-processing the second patch, as the training data for training the first machine learning model. Here, the position of the second patch in the third pathological slide image may correspond to the position of the first patch in the first pathological slide image.

Alternatively, the processor 110 may use the first patch and at least one annotation generated based on a user input, as the training data for training the first machine learning model. Here, the at least one annotation may be generated based on the third pathological slide image.

Here, the machine learning model refers to a statistical learning algorithm implemented based on the structure of a biological neural network, or a structure for executing the algorithm, in machine learning technology and cognitive science.

For example, the machine learning model may refer to a machine learning model that obtains a problem solving ability by repeatedly adjusting the weights of synapses by nodes that are artificial neurons forming a network in combination with the synapses as in biological neural network, to learn such that an error between a correct output corresponding to a particular input and an inferred output is reduced. For example, the machine learning model may include an arbitrary probability model, a neural network model, etc., used in AI learning methods, such as machine learning or deep learning.

For example, the machine learning model may be implemented as a multilayer perceptron (MLP) composed of multilayer nodes and connections therebetween. The machine learning model according to the present embodiment may be implemented by using one of various artificial neural network model structures including MLP. For example, the machine learning model may include an input layer that receives an input signal or data from the outside, an output layer that outputs an output signal or data corresponding to the input data, and at least one hidden layer between the input layer and the output layer to receive a signal from the input layer, extract features, and deliver the features to the output layer. The output layer receives a signal or data from the hidden layer and outputs the signal or data to the outside.

Thus, the machine learning model may be trained to receive one or more pathological slide images and extract features of one or more objects (e.g., cells, objects, structures, etc.) included in the pathological slide images.

The processor 110 may be implemented as an array of a plurality of logic gates, or may be implemented as a combination of a general-purpose microprocessor and a memory storing a program executable by the microprocessor. For example, the processor 110 may include a general-purpose processor, a central processing unit (CPU), a microprocessor, a digital signal processor (DSP), a controller, a microcontroller, a state machine, etc. In some environments, the processor 110 may include an application-specific integrated circuit (ASIC), a programmable logic device (PLD), a field-programmable gate array (FPGA), etc. For example, processor 110 may refer to a combination of processing devices, such as a combination of a DSP and a microprocessor, a combination of a plurality of microprocessors, a combination of one or more microprocessors combined with a DSP core, or a combination of any other such configurations.

The memory 120 may include any non-transitory computer-readable recording medium. For example, the memory 120 may include a permanent mass storage device, such as random-access memory (RAM), read-only memory (ROM), a disk drive, a solid-state drive (SSD), or flash memory. As another example, the permanent mass storage device, such as ROM, an SSD, flash memory, or a disk drive, may be a permanent storage device separate from the memory. Also, the memory 120 may store an operating system (OS) and at least one program code (e.g., code for the processor 110 to perform an operation to be described below with reference to FIGS. 4 to 13B).

These software components may be loaded from a computer-readable recording medium separate from the memory 120. The separate computer-readable recording medium may be a recording medium that may be directly connected to the user terminal 100, and may include, for example, a computer-readable recording medium, such as a floppy drive, a disk, a tape, a digital video disc (DVD)/compact disc ROM (CD-ROM) drive, or a memory card. Alternatively, the software components may be loaded into the memory 120 through the communication module 140 rather than a computer-readable recording medium. For example, at least one program may be loaded into the memory 120 on the basis of a computer program (e.g., a computer program for the processor 110 to perform an operation to be described below with reference to FIGS. 4 to 13B, or the like) installed by files provided via the communication module 140 by developers or a file distribution system that distributes installation files of applications.

The input/output interface 130 may be a unit for an interface with a device (e.g., a keyboard or a mouse) for input or output that may be connected to the user terminal 100 or included in the user terminal 100. Although FIG. 3A illustrates that the input/output interface 130 is an element implemented separately from the processor 110, the present disclosure is not limited thereto, and the input/output interface 130 may be implemented to be included in the processor 110.

The communication module 140 may provide a configuration or function for the server 20 and the user terminal 100 to communicate with each other through a network. In addition, the communication module 140 may provide a configuration or function for the user terminal 100 to communicate with another external device. For example, a control signal, a command, data, and the like provided under control by the processor 110 may be transmitted to the server 20 and/or an external device through the communication module 140 and a network.

Meanwhile, although not illustrated in FIG. 3A, the user terminal 100 may further include a display device. Alternatively, the user terminal 100 may be connected to an independent display device by a wired or wireless communication method to transmit and receive data to and from the display device. For example, a pathological slide image, information obtained by analyzing the pathological slide image, and therapeutic reaction prediction information may be provided to the user 30 through the display device.

Figure 3B:
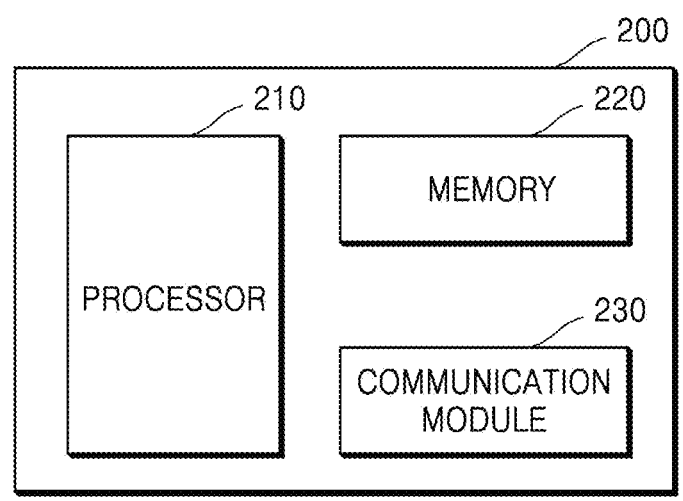
FIG. 3B is a configuration diagram illustrating an example of a server according to an embodiment.

FIG. 3B is a configuration diagram illustrating an example of a server according to an embodiment.

Referring to FIG. 3B, a server 200 includes a processor 210, a memory 220, and a communication module 230. For convenience of description, FIG. 3B illustrates only components related to the present disclosure. Accordingly, the server 200 may further include other general-purpose components, in addition to the components illustrated in FIG. 3B. In addition, it is obvious to those of skill in the art related to the present disclosure that the processor 210, the memory 220, and the communication module 230 illustrated in FIG. 3B may also be implemented as independent devices.

The processor 210 may obtain a pathological slide image from at least one of the memory 220, an external memory (not shown), the user terminal 10, or an external device. The processor 210 may obtain a first pathological slide image in which at least one first object is expressed, and biological information of the at least one first object, may generate training data by using at least one first patch included in the first pathological slide image, and the biological information, may train a first machine learning model based on the training data, and/or may analyze a second pathological slide image by using the trained first machine learning model. Also, the processor 210 may predict a therapeutic reaction of a subject corresponding to the second pathological slide image by using spatial transcriptomics information of a second object expressed in the second pathological slide image.

In other words, at least one of the operations of the processor 110 described above with reference to FIG. 3A may be performed by the processor 210. In this case, the user terminal 100 may output, through the display device, information transmitted from the server 200.

Meanwhile, an implementation example of the processor 210 is the same as that of the processor 110 described above with reference to FIG. 3A, and thus, detailed descriptions thereof will be omitted.

The memory 220 may store various types of data, such as a pathological slide image or data generated according to an operation of the processor 210. Also, the memory 220 may store an OS and at least one program (e.g., a program required for the processor 210 to operate, or the like).

Meanwhile, an implementation example of the memory 220 is the same as that of the memory 120 described above with reference to FIG. 3A, and thus, detailed descriptions thereof will be omitted.

The communication module 230 may provide a configuration or function for the server 200 and the user terminal 100 to communicate with each other through a network. In addition, the communication module 230 may provide a configuration or function for the server 200 to communicate with another external device. For example, a control signal, a command, data, and the like provided under control by the processor 210 may be transmitted to the user terminal 100 and/or an external device through the communication module 230 and a network.

Figure 4:
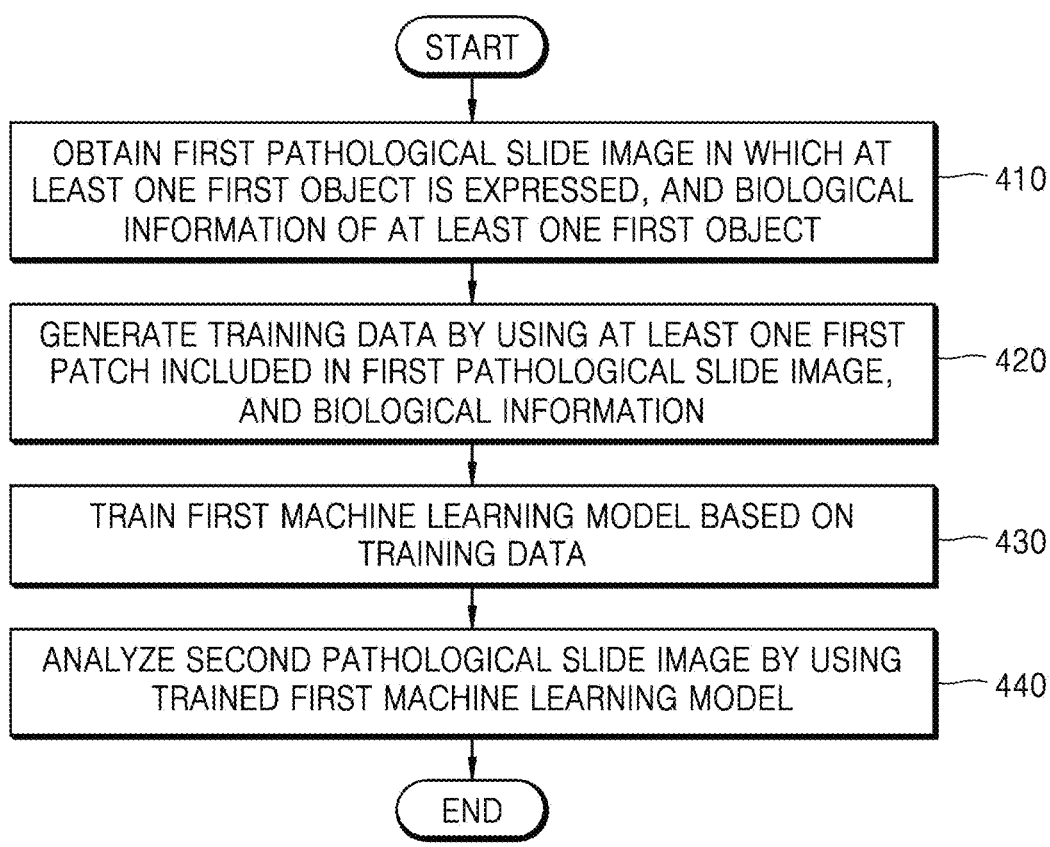
FIG. 4 is a flowchart for describing an example of a method of processing a pathological slide image according to an embodiment.

FIG. 4 is a flowchart for describing an example of a method of processing a pathological slide image according to an embodiment.

Referring to FIG. 4, the method of processing a pathological slide image includes operations that are processed, in a time-series manner, by the user terminal 10 or 100 or the processor 110 illustrated in FIGS. 1 to 3A. Thus, the descriptions provided above with respect to the user terminal 10 or 100 or the processor 110 illustrated in FIGS. 1 and 3A, which are even omitted below, may also be applied to the method of processing a pathological slide image of FIG. 4.

In addition, as described above with reference to FIGS. 1 to 3B, at least one of operations of the flowchart illustrated in FIG. 4 may be processed by the server 20 or 200 or the processor 210.

In operation 410, the processor 110 obtains a first pathological slide image in which at least one first object is expressed, and biological information of the at least one first object. For example, the first object may refer to a cell, tissue, and/or structure in a human body.

For example, the biological information may include spatial transcriptomics information of the first object and information identified from a third pathological slide image. Here, the third pathological slide image refers to a pathological slide image where the first object is stained by a method that is different from that of the first pathological slide image.

Hereinafter, the biological information will be described in detail with reference to FIG. 5.

Figure 5:
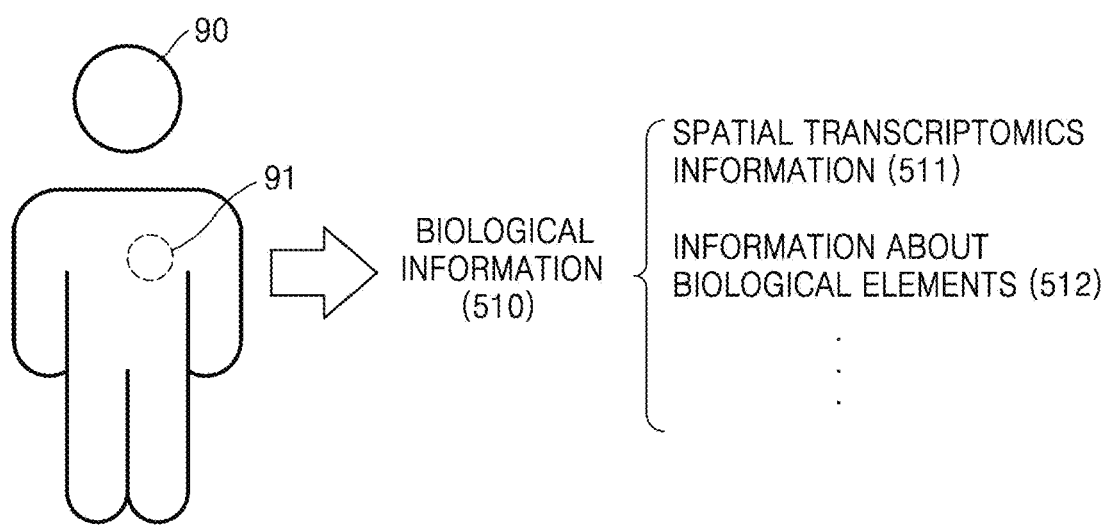
FIG. 5 is a diagram for describing examples of biological information according to an embodiment.

FIG. 5 is a diagram for describing examples of biological information according to an embodiment.

FIG. 5 illustrates the subject 90 and an object 91 included in the body of the subject 90.

For example, biological information of the object 91 may include spatial transcriptomics information 511 of the object 91. The spatial transcriptomics information 511 refers to information obtained through a spatial transcriptomics process. For example, the spatial transcriptomics information 511 may include sequence data obtained through the spatial transcriptomics process, gene expression information identified by performing data processing on the sequence data, and the like.

The spatial transcriptomics process is a molecular profiling method of measuring gene expression in a tissue sample, and mapping the positions at which genes are expressed. The relative positional relationship between cells and tissues is important for understanding the normal development of cells or tissues and the pathology of disease. However, the existing bulk-ribonucleic acid (RNA) seq analyzes various tissues and cells all together at once, and thus is unable to identify detailed gene expression patterns in space. Through the spatial transcriptomics process, gene expression patterns in space may be identified. Accordingly, not only the understanding of a disease but also the accuracy of diagnosis and treatment of the disease may be improved.

The spatial transcriptomics information includes a pathological slide image and/or genetic information corresponding to at least one grid included in the pathological slide image. For example, the pathological slide image may be divided into a plurality of grids. One grid may be a region of 1 mm*1 mm, but is not limited thereto.

The processor 110 may extract a partial region (e.g., a single grid or a plurality of grids) of the pathological slide image by processing the sequence data, and obtain spatial transcriptomics information by obtaining genetic information corresponding to the extracted region.

Hereinafter, an example in which the processor 110 obtains the spatial transcriptomics information 511 of the object 91 will be described with reference to FIG. 6.

Figure 6:
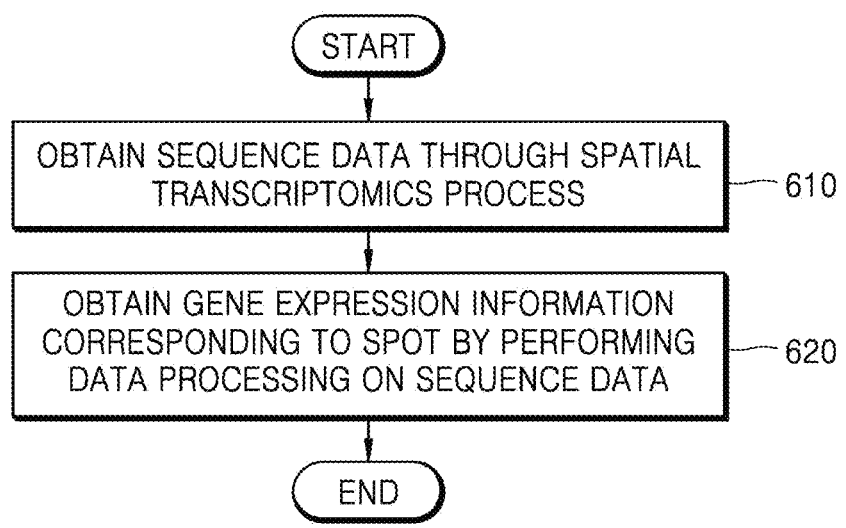
FIG. 6 is a flowchart for describing an example in which a processor obtains spatial transcriptomics information, according to an embodiment.

FIG. 6 is a flowchart for describing an example in which a processor obtains spatial transcriptomics information, according to an embodiment.

In operation 610, the processor 110 obtains sequence data through a spatial transcriptomics process.

For example, the spatial transcriptomics process may include sample preparation, imaging, barcoding and library construction, and sequencing.

In operation 620, the processor 110 obtains gene expression information corresponding to a spot by performing data processing on the sequence data.

The processor 110 obtains genetic information corresponding to the position of the spot in the pathological slide image, by processing the sequence data. For example, the pathological slide image may be divided into a plurality of spots. One spot may be a circular region with a diameter of 55 μm, but is not limited thereto.

For example, the processor 110 may identify at which position of the pathological slide image the genetic information included in the sequence data is expressed, based on barcode information included in the sequence data. Here, a barcode represents coordinates of a particular spot in the pathological slide image, and may be determined in advance. That is, the barcode and the coordinates on the pathological slide image may be matched with each other.

For example, 30,000 complementary deoxyribonucleic acid (cDNA) sequence reads per spot may be required, but the present disclosure is not limited thereto. Here, the sequence read refers to a portion sequenced from a DNA fragment. In detail, read1 of pair-end sequence data may include a barcode that is matched with coordinates (i.e., coordinates in the pathological slide image), and read2 may include transcript sequence information. That is, one end of the DNA fragment may include a barcode value corresponding to coordinates of a spot at which the DNA fragment is obtained, and another end thereof may include sequence information.

The processor 110 may identify gene expression information by aligning a fastq file including sequence information, with a reference genome. In addition, the processor 110 may obtain a plurality of pieces of gene expression information (e.g., about 5,000 pieces of gene expression information) for each spot of the pathological slide image, through spatial information identified based on the barcode.

Meanwhile, although not illustrated in FIG. 6, the processor 110 may identify which type of cells are present in the spot by using the gene expression information corresponding to the spot. In general, immune cells, cancer cells, and the like have cell-specifically highly expressed genes. Thus, by interpreting the gene expression information corresponding to the spot, the processor 110 may identify which cells are distributed in the spot region, or which cells are included in the spot region in what proportion.

Meanwhile, the processor 110 may further use single-cell RNAseq data to determine the number and types of cells distributed in the spot region. In general, single-cell RNAseq data does not include spatial information, but includes only RNA information of each cell. Thus, the processor 110 may mathematically analyze sequence data and single-cell RNAseq data regarding a plurality of cells (e.g., about 10 cells) included in each spot, to identify which type of cells are included in each spot in what amount or proportion.

Meanwhile, the processor 110 may identify which type of cells are present in the spot, based on the sequence data by using a machine learning model. To this end, the processor 110 may train the machine learning model by using training data. For example, the training data may include sequence data obtained in operation 610 as input data, and types of cell as output data. As another example, the training data may include sequence data obtained in operation 610 and a patch of the pathological slide image corresponding to the sequence data as input data, and types of cell as output data. That is, the machine learning model may be trained to identify the type of a cell considering not only sequence data but also morphological features included in a pathological slide image.

As described above with reference to FIG. 6, the processor 110 may generate a plurality of tuples each including [a patch of the pathological slide image, gene expression information corresponding to the patch]. Also, the processor 110 may generate a plurality of tuples each including [a patch of the pathological slide image, information about the type of at least one cell corresponding to the patch]. Also, the processor 110 may generate a plurality of tuples each including [a patch of the pathological slide image, gene expression information corresponding to the patch, information about the type of at least one cell corresponding to the patch]. Tuples generated in this manner may be used as training data for the first machine learning model. Training of the first machine learning model will be described below with reference to operations 420 and 430.

Referring back to FIG. 5, as another example, the biological information of the object 91 may include information 512 about biological elements (e.g., cancer cells, immune cells, cancer regions, etc.) of the object 91. Here, the information 512 about the biological elements may be identified from a pathological slide image of the object 91.

Depending on the method of staining the pathological slide, various pieces of biological information about the object 91 may be identified. Thus, if pathological slides are stained by different methods, different pieces of biological information of the same object 91 may be identified from the pathological slides images.

For example, in hematoxylin and eosin (H&E) stain, hematoxylin stains mainly the nuclear region blue-purple, and eosin stains the cytoplasm or extracellular matrix pink. Thus, through H&E stain, the morphology of a cell and a tissue included in the object may be easily identified.

However, H&E stain has limitations in identifying specific biological elements expressed in cells or the like. Thus, the expression level of a particular biological element may be identified through immunohistochemistry stain, special stain, immunofluorescence, and the like.

For example, immunohistochemical staining methods may include programmed cell death-ligand 1 (PD-L1) staining, human epidermal growth factor receptor 2 (HER2) staining, estrogen receptor (ER) staining, progesterone receptor (PR) staining, Ki-67 staining, CD68 staining, and the like. In addition, special staining methods may include Van Gieson staining, Toluidine blue staining, Giemsa staining, Masson's trichrome staining, Periodic acid-Schiff (PAS) staining, and the like. In addition, immunofluorescence staining methods may include fluorescence in situ hybridization (FISH) and the like.

Through the various staining methods described above, various biological elements may be identified.

For example, the expression level of a particular cell signal that is not identified from an H&E-stained pathological slide image may be identified. For example, PD-L1 or HER2 is a protein or a receptor expressed in malignant tumor cell membranes or the like, and the expression level thereof in tumor cell tissues may be evaluated through PD-L1 staining or HER2 staining. Thus, in the case of a high expression level, it may be expected, from the PD-L1-stained or HER2-stained pathological slide image, that the therapeutic reaction to a cancer therapy targeting the corresponding protein or receptor will be high.

As another example, components of a tissue that are not clearly observed from the H&E-stained pathological slide image may be accurately identified. For example, since Van Gieson staining specifically stains only collagen, only collagen expression in a tissue may be identified.

As another example, the presence or absence and/or amount of particular cells that are not identified from the H&E-stained pathological slide image may be identified. For example, because CD68 specifically stains macrophages, the number of macrophages, which may not be well distinguished, in the H&E-stained pathological slide image, from other inflammatory cells, may be easily identified in a CD68-stained pathological slide image.

The processor 110 may use the spatial transcriptomics information 511 and/or the biological element information 512 as training data for the machine learning model. An example of using the information 512 about the biological elements as the training data will be described below with reference to FIGS. 10 and 11.

Referring back to FIG. 4, in operation 420, the processor 110 generates training data by using at least one first patch included in the first pathological slide image, and the biological information.

For example, the training data may include at least one of gene expression information corresponding to the patch, and the type of at least one cell expressed in the patch. Information about 'the type of the at least one cell expressed in the patch' included in the training data may be information obtained by processing gene expression information, as described above with reference to FIG. 6.

Hereinafter, an example of training data for training a first machine learning model will be described with reference to FIG. 7.

Figure 7:
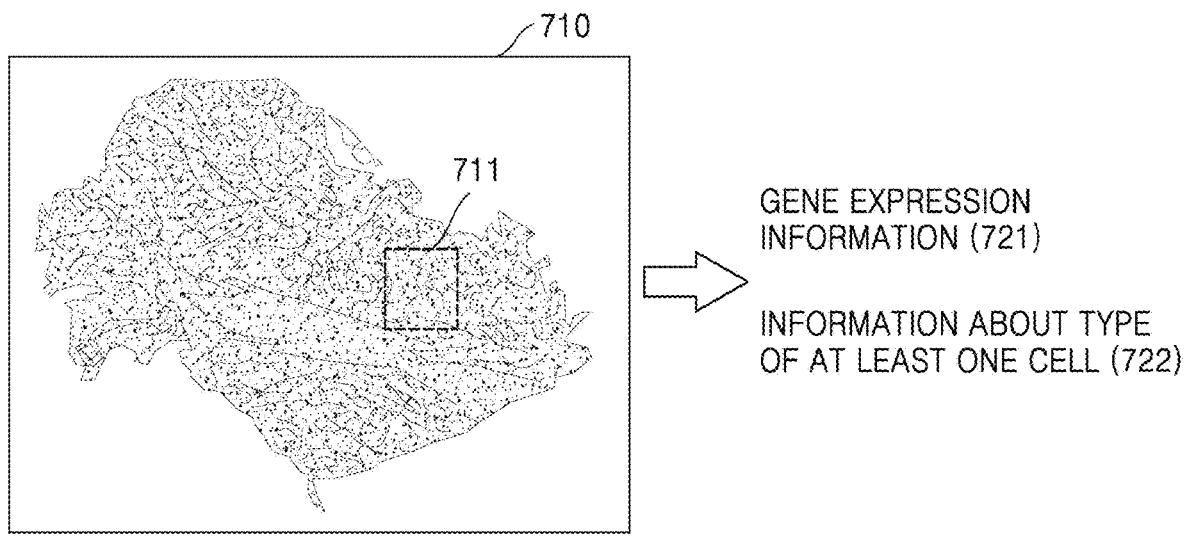
FIG. 7 is a diagram for describing an example of training data according to an embodiment.

FIG. 7 is a diagram for describing an example of training data according to an embodiment.

FIG. 7 illustrates a patch 711 in a pathological slide image 710. As described above with reference to FIG. 6, the processor 110 may generate a plurality of tuples that may be used as training data. For example, the tuple may be [the patch 711, gene expression information 721 corresponding to the patch 711], [the patch 711, information 722 about the type of at least one cell corresponding to the patch 711], or [the patch 711, the gene expression information 721 corresponding to the patch 711, the information 722 about the type of the at least one cell corresponding to the patch 711].

In other words, the training data may include the gene expression information 721 of an object expressed in the patch 711 and/or the information 722 about the type of at least one cell of the object expressed in the patch 711. The information about the type of the at least one cell expressed in the patch 711 may be obtained by processing the gene expression information 721.

Referring back to FIG. 4, in operation 430, the processor 110 trains the first machine learning model based on the training data.

For example, the processor 110 may train the first machine learning model by using the training data generated in operation 420 as ground-truth data. In other words, for the training of the first machine learning model, patches of pathological slide images may be used as input data, and tuples each including [a patch of a pathological slide image, gene expression information corresponding to the patch], tuples each including [a patch of a pathological slide image, information about the type of at least one cell corresponding to the patch], or tuples each including [a patch of a pathological slide image, gene expression information corresponding to the patch, information about the type of at least one cell corresponding to the patch] may be used as output data.

For example, in a case in which tuples each including [a patch of a pathological slide image, gene expression information corresponding to the patch] are used as output data, the first machine learning model may be trained to receive an input of a patch and predict gene expression information at the position of the patch.

As another example, in a case in which tuples each including [a patch of a pathological slide image, information about the type of at least one cell corresponding to the patch] are used as output data, the first machine learning model may be trained to receive an input of a patch and predict the types of cells present at the position of the patch.

As yet another example, in a case in which tuples each including [a patch of a pathological slide image, gene expression information corresponding to the patch, information about the type of at least one cell corresponding to the patch] are used as output data, the first machine learning model may be trained to receive a patch and predict gene expression information and the types of cell corresponding to the position of the patch.

In addition, the processor 110 may also train the first machine learning model by using at least one annotation generated based on a user input. For example, training of the first machine learning model using annotations may be additionally performed in a case in which the performance of the training using the training data generated in operation 420 as ground-truth data is insufficient, but the present disclosure is not limited thereto.

For example, the user 30 may perform the annotation task by referring to a patch of a pathological slide image, and position information within the patch may be included in an annotation. Meanwhile, the number of users who perform annotation is not limited.

In addition, the processor 110 may also generate a second machine learning model for identifying the type of at least one cell included in an object, by adding at least one layer to the trained first machine learning model, removing at least one layer included in the trained first machine learning model, or removing at least one layer from the trained first machine learning model and then adding at least one layer thereto.

For example, in a case in which tuples each including [a patch of a pathological slide image, gene expression information corresponding to the patch] are used to train the first machine learning model, the processor 110 may generate the second machine learning model by adding at least one layer for predicting the type of a cell, to the trained first machine learning model.

As another example, in a case in which tuples each including [a patch of a pathological slide image, gene expression information corresponding to the patch, information about the type of at least one cell corresponding to the patch] are used to train the first machine learning model, the processor 110 may generate the second machine learning model by removing at least one layer for predicting gene expression information, from the trained first machine learning model and then adding a new layer thereto.

In operation 440, the processor 110 analyzes a second pathological slide image by using the trained first machine learning model.

Although not illustrated in FIG. 4, in a case in which the processor 110 generates the second machine learning model, the processor 110 may analyze the second pathological slide image by using the second machine learning model.

As described above with reference to FIGS. 4 to 7, unlike conventional training of a machine learning model that depends on annotation tasks by experts, the processor 110 may improve the performance of a machine learning model even without performing annotation tasks (or even with a small amount of annotation results). Accordingly, the accuracy of a result of analyzing a pathological slide image by the machine learning model may be improved.

Figure 8:
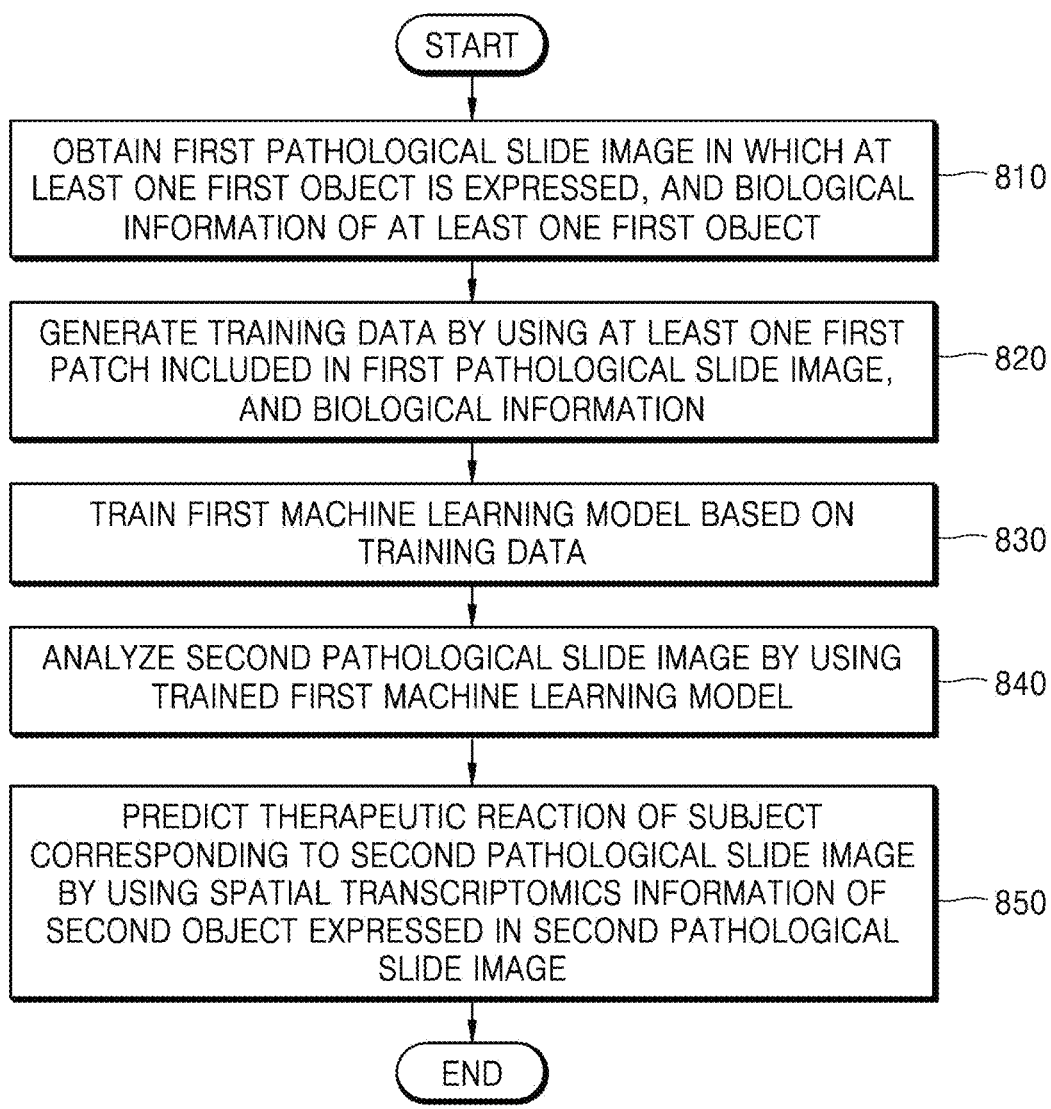
FIG. 8 is a flowchart for describing another example of a method of processing a pathological slide image according to an embodiment.

FIG. 8 is a flowchart for describing another example of a method of processing a pathological slide image according to an embodiment.

Referring to FIG. 8, the method of processing a pathological slide image includes operations that are processed, in a time-series manner, by the user terminal 10 or 100 or the processor 110 illustrated in FIGS. 1 to 3A. Thus, the descriptions provided above with respect to the user terminal 10 or 100 or the processor 110 illustrated in FIGS. 1 and 3A, which are even omitted below, may also be applied to the method of processing a pathological slide image of FIG. 8.

In addition, as described above with reference to FIGS. 1 to 3B, at least one of operations of the flowchart illustrated in FIG. 8 may be processed by the server 20 or 200 or the processor 210.

Meanwhile, operations 810 to 840 correspond to operations 410 to 440, respectively. Therefore, detailed descriptions of operations 810 to 840 will be omitted below.

In operation 850, the processor 110 predicts a therapeutic reaction of the subject 90 corresponding to the second pathological slide image by using spatial transcriptomics information of a second object expressed in the second pathological slide image.

For example, the processor 110 may predict the therapeutic reaction of the subject 90 by using the third machine learning model. Here, the spatial transcriptomics information of the second object may include at least one of spatial transcriptomics information (e.g., gene expression information) obtained by the trained first machine learning model and/or separately obtained spatial transcriptomics information. Hereinafter, an example in which the processor 110 predicts the therapeutic reaction of the subject 90 will be described with reference to FIG. 9.

Figure 9:
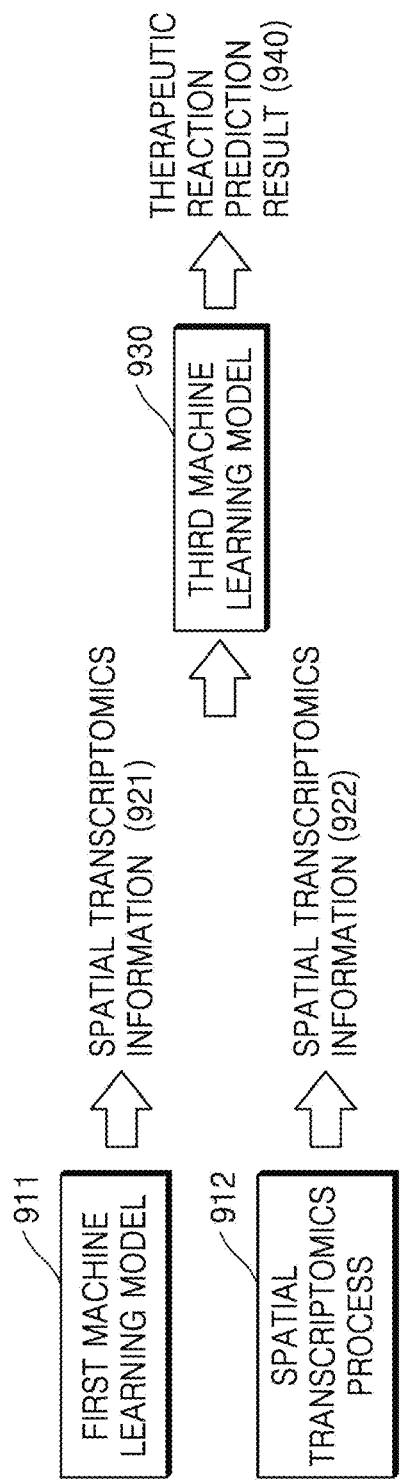
FIG. 9 is a diagram for describing an example in which a processor predicts a therapeutic reaction of a subject, according to an embodiment.

FIG. 9 is a diagram for describing an example in which a processor predicts a therapeutic reaction of a subject, according to an embodiment.

Referring to FIG. 9, spatial transcriptomics information 921 may be generated through a trained first machine learning model 911. In addition, spatial transcriptomics information 922 may be generated through a separate spatial transcriptomics process 912. Gene expression information corresponding to a pathological slide image and each of grids included in the image may be obtained through the spatial transcriptomics process 912, as described above with reference to operation 610.

The processor 110 generates a therapeutic reaction prediction result 940 by using a third machine learning model 930. For example, the spatial transcriptomics information 921 and/or the spatial transcriptomics information 922 may be input to the third machine learning model 930, and the therapeutic reaction prediction result 940 for the subject 90 may be generated.

For example, the third machine learning model 930 may be trained by using gene expression information included in spatial transcriptomics information, and position information corresponding to the gene expression information.

In general, in a case in which a machine learning model (e.g., a convolutional neural network) is trained based on two-dimensional images, a filter of a certain size (e.g., 3*3 pixels) is applied to identify patterns of the images, and such an operation is performed for each channel (e.g., three RGB channels). Then, the machine learning model is trained by performing backpropagation based on the difference between a result value that is output based on values through the filters and a multilayer neural network, and an actual result value (e.g., ground truth).

Similar to the process described above, the processor 110 according to an embodiment may substitute gene expression information corresponding to each spot for the channels of two-dimensional image, and may substitute position information corresponding to the gene expression information for the pixels of two-dimensional image. In addition, the processor 110 may train the third machine learning model 930 by performing backpropagation based on the difference between a result value output through a multilayer neural network of the third machine learning model 930, and a result value for an actual therapeutic reaction or prognosis of a patient.

Here, in order to substitute gene expression information corresponding to each spot for the channels, the gene expression information needs to be spatially divided. Thus, the processor 110 may obtain genetic information corresponding to the position of each spot in the pathological slide image by performing the process described above with reference to operation 610.

As another example, the third machine learning model 930 may be trained by using a feature vector extracted from at least one layer included in the first machine learning model.

As described above with reference to operation 430, the first machine learning model may be trained to, based on a patch, predict gene expression information at the position of the patch, predict the types of cells present at the position of the patch, or predict gene expression information and the types of cells corresponding to the position of the patch.

First, the processor 110 may input the pathological slide image to the trained first machine learning model, and extract a feature vector from at least one layer included in the trained first machine learning model. For example, the extracted layer may be a layer determined and selected empirically by the user 30, or may be a layer that appropriately predicts a therapeutic reaction or prognosis of the subject 90. That is, assuming that the first machine learning model has been well trained to extract, from a pathological slide image, genetically and/or histologically important information (e.g., gene expression information or the types and characteristics of cells, which are the basis for predicting a therapeutic reaction), it may be expected that a feature vector extracted from any intermediate layer of the trained first machine learning model also includes genetically and/or histologically important information.

The processor 110 may perform the process of extracting a feature vector from at least one layer included in the trained first machine learning model, on all of the patches included in a single pathological slide image.

Then, the processor 110 may perform pooling to integrate the feature vectors into a vector having a certain length. For example, the processor 110 may perform pooling using an average value of feature vectors, pooling using a maximum value in each dimension of feature vectors, dictionary-based pooling such as Bag-of-Words or Fisher Vector, or attention-based pooling using an artificial neural network. Through such pooling, a single vector corresponding to the pathological slide image of the subject 90 may be defined.

Then, the processor 110 may train the third machine learning model 930 to predict responsiveness to a particular immuno-oncology therapy or responsiveness to a particular treatment, by using the defined vector.

As described above with reference to FIGS. 8 and 9, the processor 110 may perform training of the third machine learning model 930 and prediction of a therapeutic reaction of the subject 90 through the third machine learning model 930, and thus, the prediction accuracy may be improved compared to predicting responsiveness to a treatment by using only morphological features of the pathological slide image.

As described above with reference to FIGS. 6 and 7, the processor 110 may train the first machine learning model by using the spatial transcriptomics information 511. In addition, the processor 110 may train the first machine learning model by using the information 512 about the biological elements. Hereinafter, examples in which the processor 110 trains the first machine learning model by using the information 512 about the biological elements will be described with reference to FIGS. 10 and 11.

Figure 10:
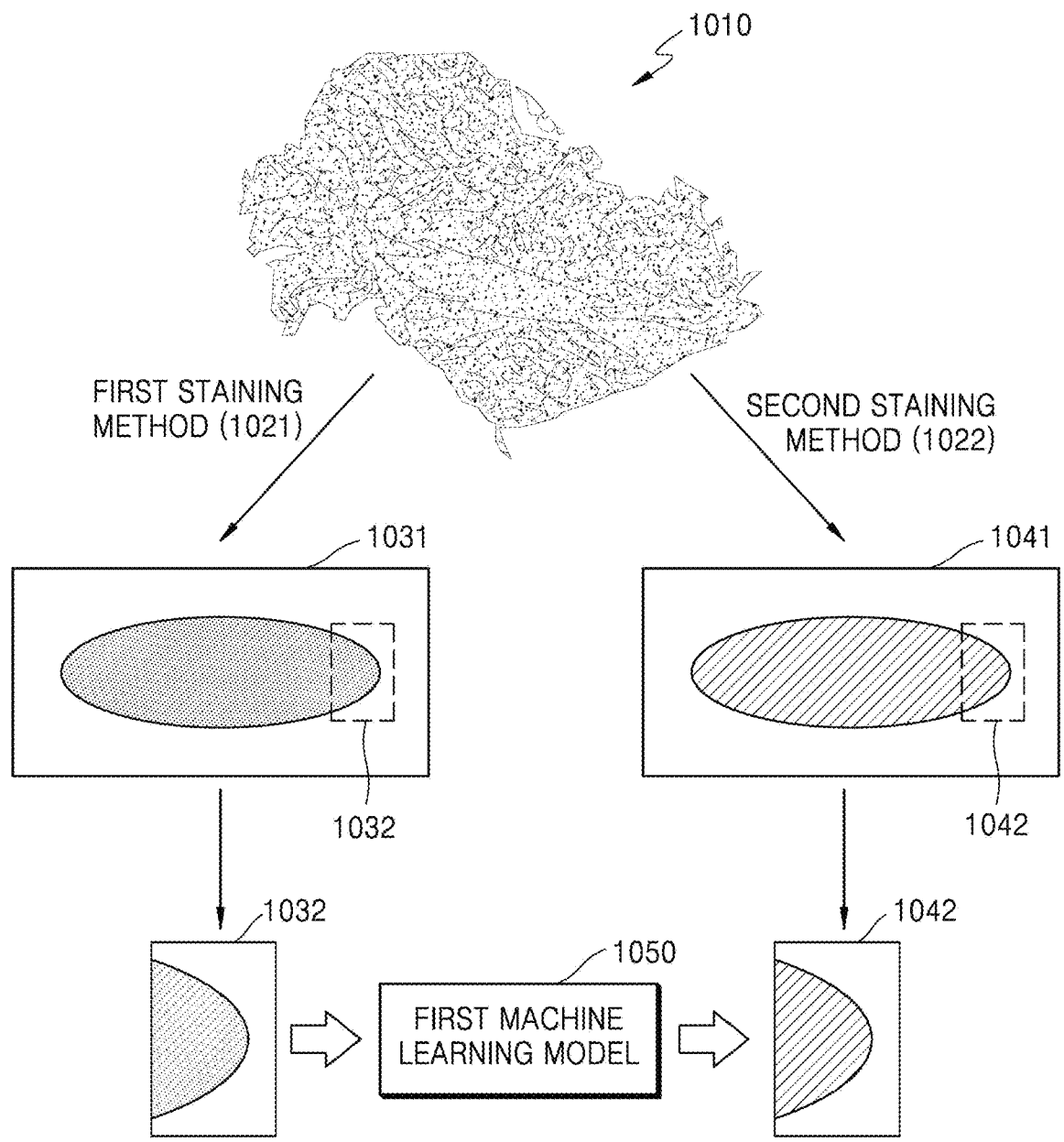
FIG. 10 is a diagram for describing an example in which a processor trains a first machine learning model, according to an embodiment.

FIG. 10 is a diagram for describing an example in which a processor trains a first machine learning model, according to an embodiment.

FIG. 10 illustrates an object 1010 and pathological slide images 1031 and 1041 showing the object 1010. Here, it is assumed that a first staining method 1021 of the pathological slide image 1031 and a second staining method 1022 of the pathological slide image 1041 are different from each other. For example, the first staining method 1021 may include not only staining methods of selectively staining a particular biological element, but also staining methods by which the shapes of the nuclei, cytoplasms, and extracellular matrices of all cells included in an object may be easily identified (e.g. H&E stain).

The processor 110 may generate training data for training a first machine learning model 1050. Here, the training data may include a patch 1032 included in the pathological slide image 1031 and a patch 1042 included in the pathological slide image 1041. Here, the patch 1032 and the patch 1042 may represent the same position of the object 1010. In other words, the patch 1042 and the patch 1032 may indicate positions corresponding to each other.

It is assumed, in FIG. 10, that the first staining method 1021 is capable of selectively staining biological element A, and the second staining method 1022 is capable of selectively staining biological element B. Methods of selectively staining various biological elements are as described above with reference to FIG. 5. In addition, although FIG. 10 illustrates the pathological slide images 1031 and 1041 according to two types of the staining methods 1021 and 1022, the present disclosure is not limited thereto.

The processor 110 performs image processing such that the object 1010 on the image 1031 and the object 1010 on the image 1041 overlap precisely. For example, the processor 110 may apply geometric transformation (e.g., enlargement, reduction, or rotation) to the image 1031 and the image 1041, to accurately align the object 1010 in the image 1031 with the object 1010 in the image 1041. In addition, the processor 110 extracts the patches 1032 and 1042 from the corresponding positions of the images 1031 and 1041. In this way, the processor 110 may generate a plurality of pairs of a patch extracted from image 1031 and a patch extracted from image 1041.

Then, the processor 110 trains the first machine learning model 1050 by using the patches 1032 and 1042. For example, the processor 110 may train the first machine learning model 1050 by using the patch 1032 as input data and the patch 1042 as output data. In this case, the patch 1042 may be used as ground-truth data.

Figure 11:
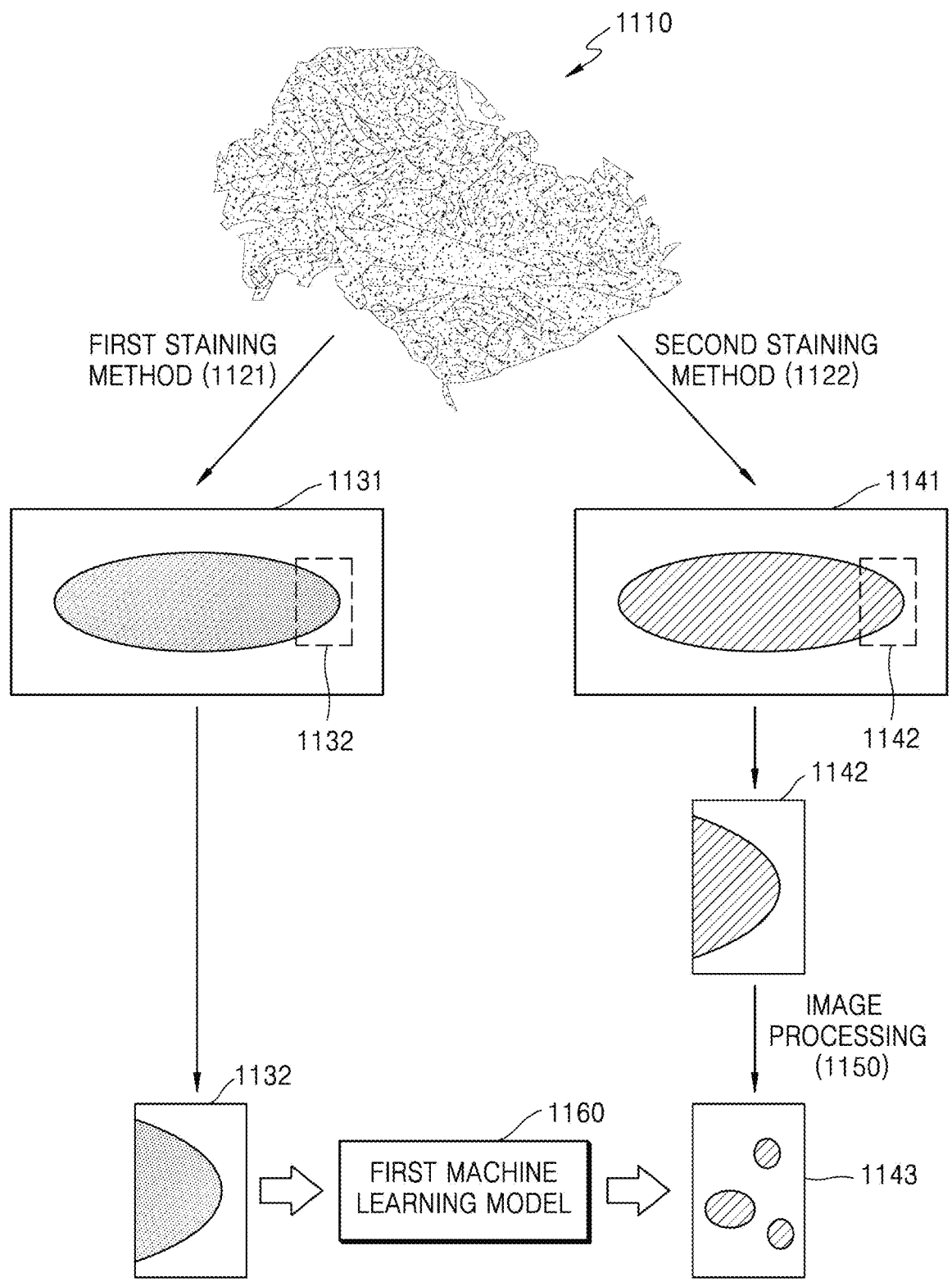
FIG. 11 is a diagram for describing another example in which a processor trains a first machine learning model, according to an embodiment.

FIG. 11 is a diagram for describing another example in which a processor trains a first machine learning model, according to an embodiment.

FIG. 11 illustrates an object 1110 and pathological slide images 1131 and 1141 showing the object 1110. Here, detailed descriptions of staining methods 1121 and 1122, the pathological slide images 1131 and 1141, and patches 1132 and 1142 are as described above with reference to FIG. 10.

The processor 110 may generate training data for training a first machine learning model 1160. Here, the training data may include the patch 1132 and a patch 1143 that is obtained by performing image processing 1150 on the patch 1142.

To this end, the processor 110 may generate the patch 1143 by performing one or more image processing operations on the patch 1142.

For example, the processor 110 may perform image filtering to leave only a part of the patch 1142 that is stained to a preset darkness level or higher, or may perform image filtering to leave only a part where a particular color is expressed and erase the other parts. However, the technique of image processing performed by the processor 110 is not limited to the above description.

As another example, the processor 110 may extract semantic information by applying a more complicated image processing technique or a separate machine learning model to the patch 1142, and use the extracted information as training data corresponding to the patch 1143. For example, the extracted information may correspond to information in which positions of particular cells (e.g., cancer cells or immune cells) are marked with dots, information in which types or classes of cells are determined and indicated according to the level of staining expression and/or the shape of staining expression, and the like.

Here, the image processing technique may be an algorithm that quantifies the amount of staining expression for each pixel included in the image 1141 and utilizes position information of the pixels. In this case, the extracted information may include information about the type and position of a particular cell.

Meanwhile, the separate machine learning model may be a model for recognizing the positions and types of biological elements targeted by the method 1122 by which the image 1141 is stained. For example, the separate machine learning model may be trained to, based on a patch stained by the second staining method 1122 being input thereto, detect biological element B expressed by the second staining method 1122. Here, in a case in which the second staining method 1122 stains cancer cells, the separate machine learning model may be trained to receive an input of a patch stained by the second staining method 1122, and detect cancer cells. A result of the detection may be a dot indicating the position of each cancer cell, or may be a result of segmenting cancer cells at the pixel level.

Although not illustrated in FIG. 11, the processor 110 may train the first machine learning model 1160 by using the patch 1132 and at least one annotation generated based on a user input. Here, the annotation may be generated based on the image 1141. For example, training of the first machine learning model using annotations may be additionally performed in a case in which the performance of the training using, as ground-truth data, the training data described above with reference to FIGS. 10 and 11 is insufficient, but the present disclosure is not limited thereto.

For example, the user 30 may make annotations by referring to the image 1141, and position information within the patch 1142 may be included in an annotation. Meanwhile, the number of users who make annotations is not limited.

In addition, the processor 110 may generate a separate machine learning model by adding at least one layer to the trained first machine learning model, removing at least one layer included in the trained first machine learning model, or removing at least one layer included in the trained first machine learning model and then adding at least one layer thereto. For example, the processor 110 may generate a separate machine learning model by removing, from the trained first machine learning model 1160, a layer that serves to draw an image, and newly adding a layer that performs a final purpose task. Here, the final purpose task may refer to a task of additionally recognizing biological elements that need to be separately identified in addition to biological elements that may be identified from the images 1131 and 1141. Alternatively, the final purpose task may refer to a task of deriving medical information such as the expression level of a biomarker or prediction of therapeutic responsiveness.

As described above with reference to FIGS. 10 and 11, by using pathological slide images in which the same tissue is stained with different types of materials to train a machine learning model, it is possible to solve the problem of inaccuracy and cost increase due to human annotation, and secure a large amount of training data.

Figure 12:
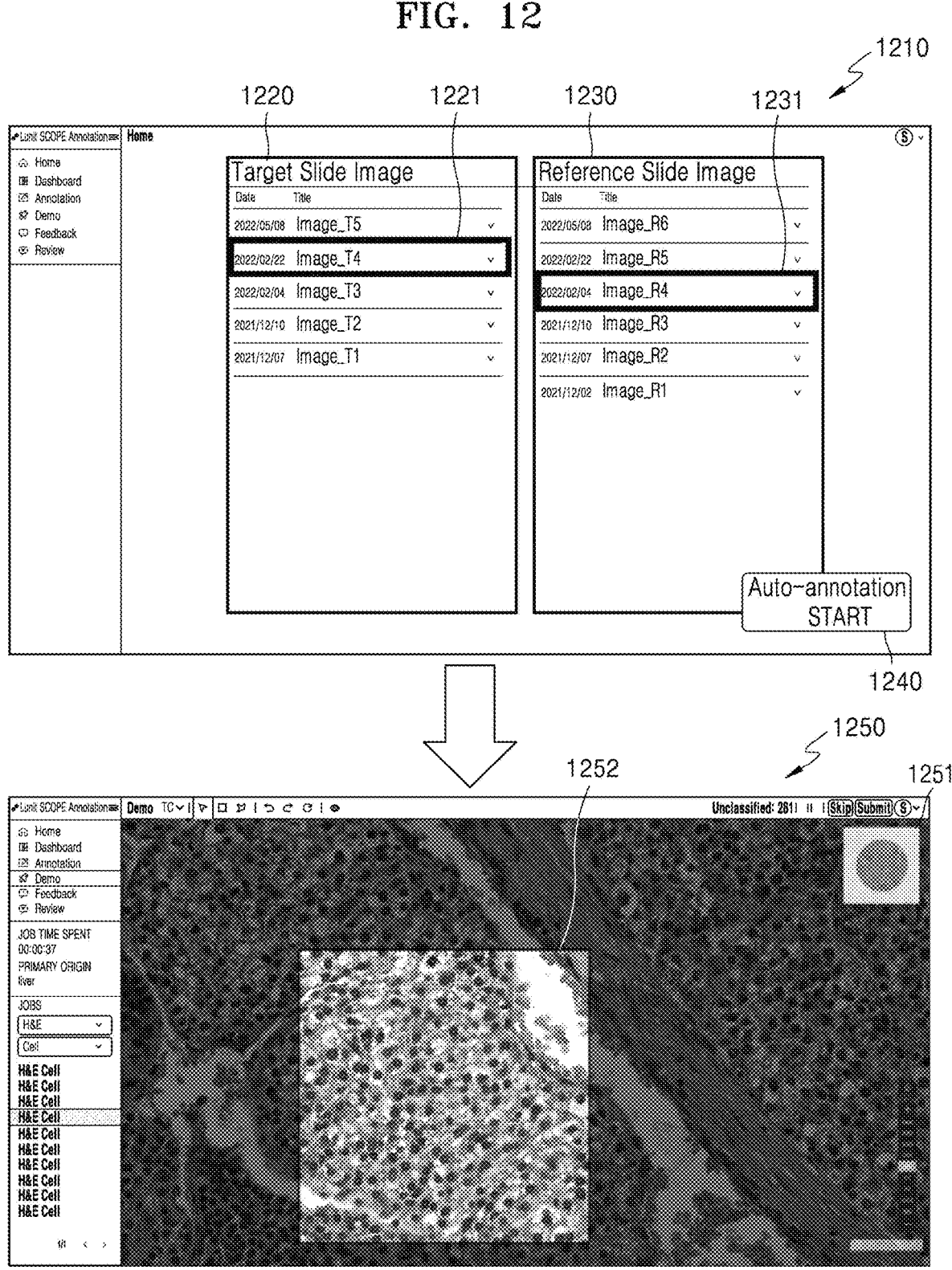
FIG. 12 is a diagram for describing an example in which an operation of a processor is implemented, according to an embodiment.

FIG. 12 is a diagram for describing an example in which an operation of a processor is implemented, according to an embodiment.

The example to be described below with reference to FIG. 12 may be the operation of the processor 110 described above with reference to FIGS. 10 and 11. For example, according to the example illustrated in FIG. 12, the processor 110 may train the first machine learning model 1050 or 1160.

FIG. 12 illustrates a screen 1210 for selecting images of pathological slides stained by different methods. However, the configuration of the screen 1210 is only an example and may be modified in various ways.

A list 1220 of target slide images and a list 1230 of reference slide images may be displayed on the screen 1210. For example, the target slide images may represent pathological slides stained with the first staining method 1021 or 1121, and the reference slide images may represent pathological slides stained with the second staining method 1022 or 1122.

When an image 1221 and an image 1231 are selected by the user 30 and then an execution button 1240 is selected, the processor 110 may perform the operation described above with reference to FIGS. 10 and 11. For example, processor 110 may train the first machine learning model 1050 or 1160 to predict the positions and/or types of biological elements (e.g., cells, proteins, and/or tissues) expressed in image 1221, based on the image 1231.

By the operation of the processor 110 described above, a screen 1250 showing the predicted positions and/or types of the biological elements expressed in the image 1221 may be output. However, the configuration of the screen 1250 illustrated in FIG. 12 is only an example, and may be modified in various ways.

For example, a mini-map 1251 indicating which part of the image 1221 is currently displayed on the screen 1250. In addition, a window 1252 indicating a part that the user 30 pays attention to, among the part currently displayed on the screen 1250 may be set in the screen 1250. Here, the position and size of the window 1252 may be preset or adjusted by the user 30.

Hereinafter, examples of performing the annotation described above with reference to FIGS. 4 and 11 will be described with reference to FIGS. 13A and 13B.

Figure 13A:
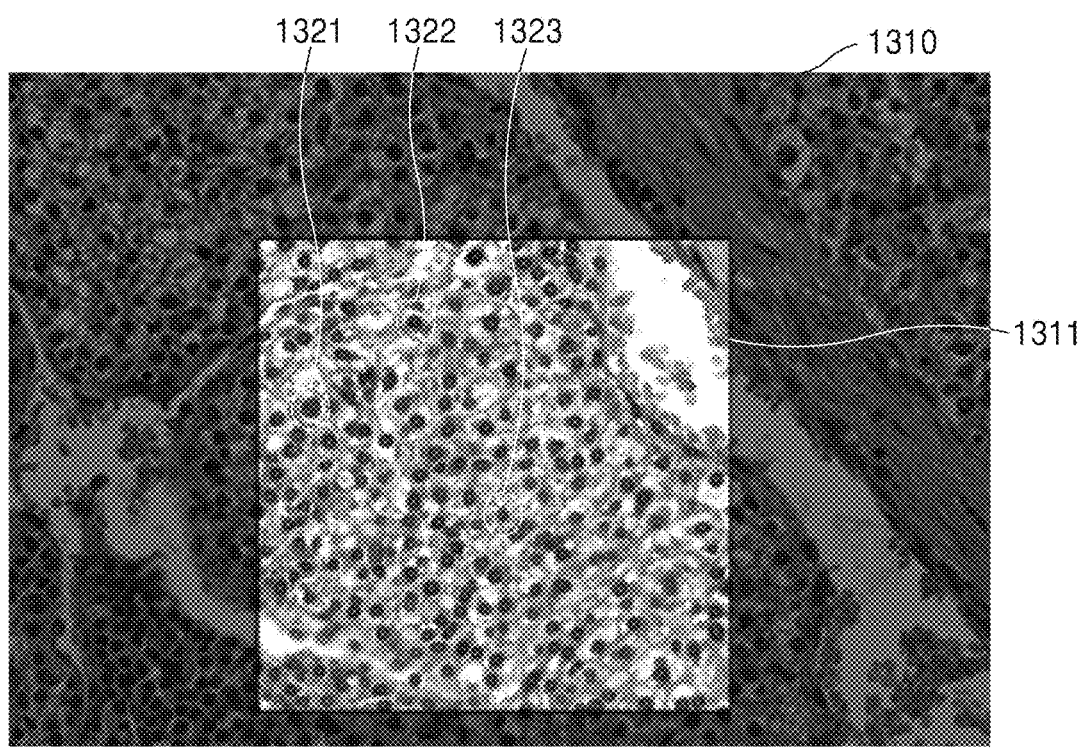
FIGS. 13A and 13B are diagrams for describing examples in which annotations are generated based on user inputs, according to an embodiment.
Figure 13B:
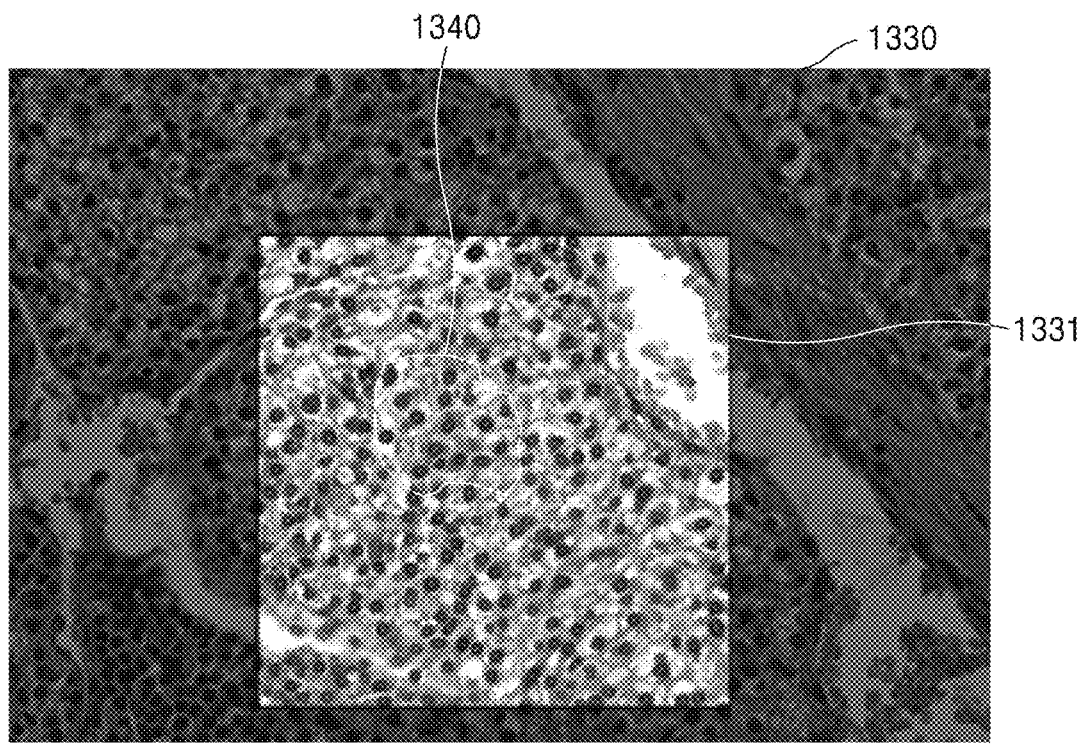

FIGS. 13A and 13B are diagrams for describing examples in which annotations are generated based on user inputs, according to an embodiment.

In a case in which it is determined that the performance of a machine learning model for recognizing biological elements (e.g., tissues, cells, or structures) in a target image is insufficient, the user 30 may manually modify an annotation.

Referring to FIG. 13A, assuming that the types and/or positions of cells 1321, 1322, and 1323 expressed in a region 1311 of a pathological slide image 1310 are incorrectly predicted, the user 30 may directly modify the labels of the cells 1321, 1322, and 1323.

Referring to FIG. 13B, the user 30 may select a grid 1340 including a plurality of cells expressed in a region 1331 of a pathological slide image 1330, and collectively correct the labeling of cells or tissues included in the grid 1340.

As described above, unlike conventional training of a machine learning model that depends on annotation tasks by experts, the processor 110 may improve the performance of the machine learning model even without performing annotation tasks (or even with a small amount of annotation results). Accordingly, the accuracy of a result of analyzing a pathological slide image by the machine learning model may be improved. In addition, the processor 110 may predict a therapeutic reaction of a subject by using a result of analyzing the pathological slide image, and thus, the accuracy of the result of predicting the therapeutic reaction may also be guaranteed.

Meanwhile, the above-described method may be written as a computer-executable program, and may be implemented in a general-purpose digital computer that executes the program by using a computer-readable recording medium. In addition, the structure of the data used in the above-described method may be recorded in a computer-readable recording medium through various units. The computer-readable recording medium includes a storage medium, such as a magnetic storage medium (e.g., ROM, RAM, a universal serial bus (USB) drive, a floppy disk, a hard disk, etc.) and an optically readable medium (e.g., a CD-ROM, a DVD, etc.).

It will be understood by those of skill in the art that the present disclosure may be implemented in a modified form without departing from the intrinsic characteristics of the descriptions provided above. Therefore, the disclosed methods should be considered in an illustrative rather than a restrictive sense, and the scope of the present disclosure should be defined by claims rather than the foregoing description, and should be construed to include all differences within the scope equivalent thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:
1. A computing device comprising:
   at least one memory; and at least one processor configured to:
obtain a first pathological slide image of a first object, and spatial transcriptomics information of the first object,
generate training data including type information of at least one cell expressed in at least one first patch included in the first pathological slide image by using the at least one first patch and the spatial transcriptomics information, wherein the type information of the at least one cell is obtained based on gene expression information corresponding to the at least one first patch,
train a first machine learning model based on the training data to predict the type information of the at least one cell, and
analyze a second pathological slide image of a second object by using the trained first machine learning model.

2. The computing device of claim 1, wherein the gene expression information includes gene expression information for each of a plurality of regions respectively associated with the at least one cell, and
the at least one processor is further configured to train the first machine learning model by using the training data as ground-truth data.

3. The computing device of claim 2, wherein the at least one processor is further configured to generate the second machine learning model configured to identify the type information of the at least one cell included in the first object, by adding or removing at least one layer in the trained first machine learning model.

4. The computing device of claim 1, wherein the at least one processor is further configured to predict a therapeutic reaction of a subject corresponding to the second pathological slide image by using spatial transcriptomics information of the second object expressed in the second pathological slide image.

5. The computing device of claim 4, wherein the predicting of the therapeutic reaction is performed by a third machine learning model, and
the spatial transcriptomics information of the second object comprises at least one of spatial transcriptomics information obtained by the trained first machine learning model and separately obtained spatial transcriptomics information.

6. The computing device of claim 5, wherein the third machine learning model is trained to predict the therapeutic reaction, by using a feature vector extracted from at least one layer included in the trained first machine learning model.

7. The computing device of claim 5, wherein the third machine learning model is trained to predict the therapeutic reaction, by using gene expression information included in the spatial transcriptomics information of the second object and position information corresponding to the gene expression information.

8. The computing device of claim 1, wherein the at least one processor is further configured to:
receive an user input for selecting at least one cell for correcting a labeling of the at least one cell;
update the labeling of the at least one cell, based on the user input; and
train the first machine learning model based on the updated labeling.

9. A method of analyzing a pathological slide image, the method comprising:
obtaining a first pathological slide image of a first object and spatial transcriptomics information of the first object;
generating training data including type information of at least one cell expressed in at least one first patch included in the first pathological slide image by using the at least one first patch and the spatial transcriptomics information, wherein the type information of the at least one cell is obtained based on gene expression information corresponding to the at least one first patch;
training a first machine learning model based on the training data to predict the type information of the at least one cell; and
analyzing a second pathological slide image of a second object by using the trained first machine learning model.

10. The method of claim 9, wherein the gene expression information includes gene expression information for each of a plurality of regions respectively associated with the at least one cell, and the training comprises training the first machine learning model by using the training data as ground-truth data.

11. The method of claim 10, wherein the training further comprises generating the second machine learning model configured to identify the type information of the at least one cell included in the first object, by adding or removing at least one layer in the trained first machine learning model.

12. The method of claim 9, further comprising predicting a therapeutic reaction of a subject corresponding to the second pathological slide image by using spatial transcriptomics information of the second object expressed in the second pathological slide image.

13. The method of claim 12, wherein the predicting of the therapeutic reaction is performed by a third machine learning model, and
the spatial transcriptomics information of the second object comprises at least one of spatial transcriptomics information obtained by the trained first machine learning model, and separately obtained spatial transcriptomics information.

14. The method of claim 13, wherein the third machine learning model is trained to predict the therapeutic reaction, by using a feature vector extracted from at least one layer included in the trained first machine learning model.

15. The method of claim 13, wherein the third machine learning model is trained to predict the therapeutic reaction, by using gene expression information included in the spatial transcriptomics information of the second object and position information corresponding to the gene expression information.

16. A computer-readable recording medium having recorded thereon a program for causing a computer to execute the method of claim 11.

* * * * *